United States Patent
Horii et al.

(10) Patent No.: US 10,523,083 B2
(45) Date of Patent: Dec. 31, 2019

(54) MOTOR

(71) Applicant: Nidec Corporation, Kyoto (JP)

(72) Inventors: Yuya Horii, Kyoto (JP); Kohei Kurazono, Kyoto (JP)

(73) Assignee: Nidec Corporation, Kyoto (JP)

( * ) Notice: Subject to any disclaimer, the term of this patent is extended or adjusted under 35 U.S.C. 154(b) by 74 days.

(21) Appl. No.: 15/972,257

(22) Filed: May 7, 2018

(65) Prior Publication Data

US 2018/0342925 A1 Nov. 29, 2018

(30) Foreign Application Priority Data

May 29, 2017 (JP) ................................ 2017-105232

(51) Int. Cl.
*H02K 5/16* (2006.01)
*H02K 5/167* (2006.01)
*H02K 21/22* (2006.01)
*F16C 17/10* (2006.01)
*F16C 33/08* (2006.01)
*H02K 15/14* (2006.01)

(52) U.S. Cl.
CPC ......... *H02K 5/1675* (2013.01); *F16C 17/107* (2013.01); *F16C 33/08* (2013.01); *H02K 15/14* (2013.01); *H02K 21/227* (2013.01); *F16C 2380/26* (2013.01)

(58) Field of Classification Search
CPC ........ H02K 5/1675; H02K 15/14; H02K 5/15; H02K 5/16–1567; H02K 5/17–1737; F16C 17/107; F16C 33/08; F16C 2380/26

USPC .......................................................... 310/90
See application file for complete search history.

(56) References Cited

U.S. PATENT DOCUMENTS

| | | | | |
|---|---|---|---|---|
| 2007/0065064 | A1* | 3/2007 | Kitamura | ................ F16C 19/54 384/537 |
| 2010/0181875 | A1* | 7/2010 | Tamaoka | ........... G11B 19/2009 310/425 |

FOREIGN PATENT DOCUMENTS

| | | | |
|---|---|---|---|
| JP | 2521607 | Y2 | 12/1996 |
| JP | 2584211 | Y2 | 10/1998 |
| JP | 2013-165620 | A | 8/2013 |

\* cited by examiner

*Primary Examiner* — Thomas Truong
(74) *Attorney, Agent, or Firm* — Keating & Bennett, LLP (57) ABSTRACT

A motor includes a bearing housing and a stator. The stator includes a stator core, an insulator, and a conductor. The insulator is an insulating body covering at least a part of the stator core. The conductor is wound around the stator core via the insulator. The bearing housing and the stator are connected to each other by a main adhesive and an auxiliary adhesive. A curing time of the auxiliary adhesive is shorter than that of the main adhesive. Therefore, the bearing housing and the stator can be temporarily fixed by the auxiliary adhesive of which the curing time is short until the main adhesive is cured. Therefore, it is possible to suppress that the position of the stator is deviated with respect to the bearing housing until the main adhesive is cured.

20 Claims, 10 Drawing Sheets

MOTOR

CROSS REFERENCE TO RELATED APPLICATIONS

This application claims the benefit of priority to Japanese Patent Application No. 2017-105232 filed on May 29, 2017. The entire contents of this application are hereby incorporated herein by reference.

BACKGROUND OF THE INVENTION

1. Field of the Invention

The present disclosure relates to a motor.

2. Description of the Related Art

In the related art, a motor having a structure, in which a bearing is held by a cylindrical bearing housing and a stator is fixed to an outer peripheral surface of the bearing housing, is known.

The motor generates a torque by a magnetic attractive force and a magnetic repulsive force generated between the stator and a rotor. Therefore, when the motor is driven, the stator may vibrate due to the magnetic attractive force and the magnetic repulsive force. The vibration can also be a cause of noise. As a method for suppressing the vibration of the stator, for example, it is conceivable to interpose an elastic adhesive material capable of absorbing the vibration between the bearing housing and the stator. However, the elastic adhesive requires a long time for curing. Therefore, it is required to suppress that a position of the stator is deviated with respect to the bearing housing during curing of the elastic adhesive.

In addition, in addition to the elastic adhesive, in a case where the adhesive having a long curing time is used, there is a demand to suppress the position deviation of the stator with respect to the bearing housing until the adhesive is cured.

SUMMARY OF THE INVENTION

An exemplary embodiment of the disclosure is a motor including a stationary portion; and a rotating portion that is rotatably supported by the stationary portion centered on a central axis extending upward and downward. The stationary portion includes a cylindrical bearing housing that extends in an axial direction around the central axis, and a stator that is disposed on an outside of the bearing housing in a radial direction. The stator includes a stator core that is a magnetic body, an insulator that is an insulating body covering at least a part of the stator core, and a conductor that is wound around the stator core via the insulator. The bearing housing and the stator are connected to each other by a main adhesive, and an auxiliary adhesive of which a curing time is shorter than that of the main adhesive.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, the exemplary embodiments of the disclosure will be described with reference to the drawings. Moreover, in the present application, a direction parallel to a central axis of a motor is referred to as an "axial direction", a direction orthogonal to the central axis of the motor is referred to as a "radial direction", and a direction along a circular arc centered on the central axis of the motor is referred to as a "circumferential direction". Moreover, in the present application, a shape and a positional relationship of each portion will be described in which the axial direction is an upward and downward direction and a claw portion side is upward with respect to a stator core. However, it is merely for the sake of convenience of explanation to define the upward and downward direction, which does not limit the direction during manufacturing and using the motor according to the invention.

In addition, in the disclosure, a "parallel direction" also includes a substantially parallel direction. In addition, in the disclosure, an "orthogonal direction" also includes a substantially orthogonal direction.

Figure 1:
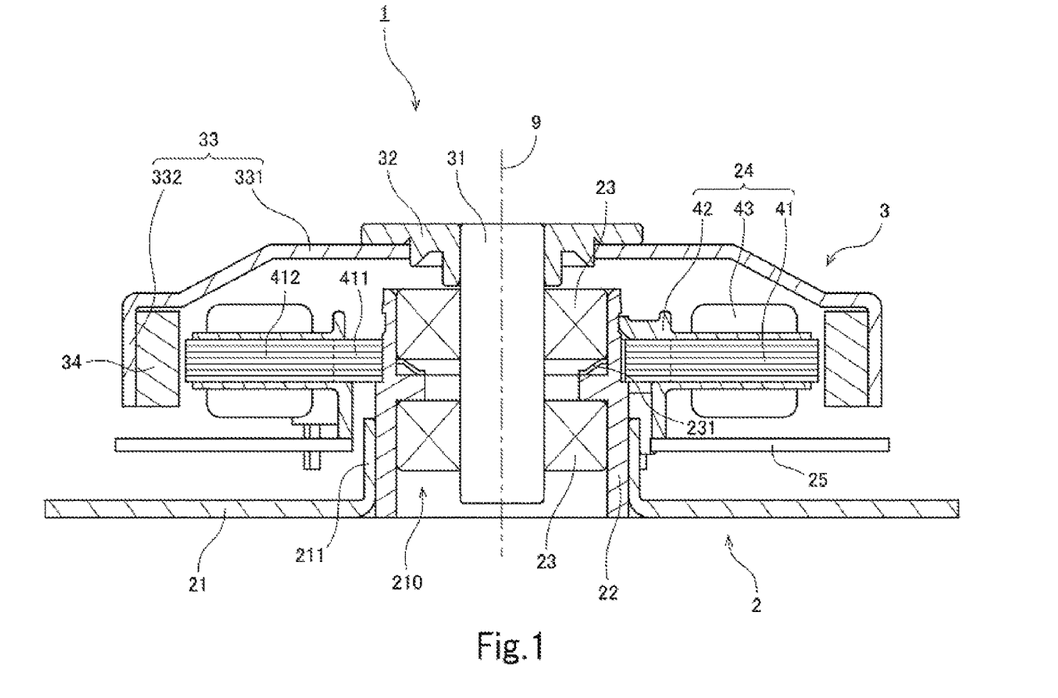
FIG. 1 is a longitudinal sectional view of a motor.

FIG. 1 is a longitudinal sectional view of a motor 1 according to an exemplary embodiment of the disclosure. As illustrated in FIG. 1, the motor 1 includes a stationary portion 2 and a rotating portion 3. The stationary portion 2 is fixed to a frame of a device (hereinafter, referred to as an "actual machine") on which the motor 1 is mounted. The rotating portion 3 is rotatably supported by the stationary portion 2.

The stationary portion 2 of the embodiment includes a base plate 21, a bearing housing 22, a pair of bearings 23, a stator 24, and a circuit board 25.

The base plate 21 is a plate-like member expanding perpendicular to a central axis 9. The base plate 21 is fixed to the frame of the actual machine, for example, by screwing. The base plate 21 has a circular hole 210 at a center. In addition, the base plate 21 has a cylindrical holding portion 211 which rises upward around the circular hole 210. As a material of the base plate 21, for example, a metal such as iron is used. However, the material of the base plate 21 is not limited to the metal and resin may be used.

The bearing housing 22 is a member that holds the pair of bearings 23. As a material of the bearing housing 22, for example, a metal such as stainless steel, or brass is used. However, the material of the bearing housing 22 is not limited to the metal and resin may be used. The bearing housing 22 the bearing housing 22 extends in the axial direction in a cylindrical shape around the central axis 9. A lower end portion of the bearing housing 22 is inserted into the circular hole 210 of the base plate 21 and is fixed to the holding portion 211.

The pair of bearings 23 is positioned on an inside of the bearing housing 22 in the radial direction. In addition, the pair of bearings 23 is disposed with a space in the upward and downward direction. As each bearing 23, for example, a ball bearing is used. An outer ring of each bearing 23 is fixed to an inner peripheral surface of the bearing housing 22. An inner ring of each bearing 23 is fixed to an outer peripheral surface of a shaft 31 which is described below. In the embodiment, the outer ring of an upper bearing 23 is pressed in the axial direction by a preload spring 231. Therefore, the bearing 23 is positioned in the axial direction.

The stator 24 is an armature that generates a magnetic flux according to a drive current. The stator 24 is disposed on an outside of the bearing housing 22 in the radial direction. As illustrated in FIG. 1, the stator 24 includes a stator core 41, an insulator 42, and a coil 43.

The stator core 41 is a magnetic body. As the stator core 41, for example, a laminated steel plate is used. The stator core 41 includes an annular core back 411 and a plurality of teeth 412. The core back 411 is fixed to the outer peripheral surface of the bearing housing 22. The plurality of the teeth 412 project from the core back 411 to the outside in the radial direction. The insulator 42 is an insulating body. As a material of the insulator 42, for example, resin is used. The insulator 42 covers at least a part of the stator core 41. The coil 43 is formed of a conductor wound around the teeth 412 via the insulator 42.

The circuit board 25 is disposed substantially perpendicular to the central axis 9 on an upper side of the base plate 21 and a lower side of the stator 24. The circuit board 25 is fixed, for example, to the insulator 42. An electric circuit for supplying a drive current to the coil 43 is mounted on the circuit board 25. An end portion of the conductor configuring the coil 43 is electrically connected to a terminal provided in the circuit board 25.

The rotating portion 3 of the embodiment includes the shaft 31, a fixing ring 32, a hub 33, and a rotor magnet 34.

The shaft 31 is a columnar member disposed along the central axis 9. As a material of the shaft 31, for example, a metal such as stainless steel is used. The shaft 31 is rotatably supported by the pair of bearings 23 centered on the central axis 9. In addition, an upper end portion of the shaft 31 is positioned above the upper bearing 23. The fixing ring 32 is an annular metal member. The fixing ring 32 is fixed to the upper end portion of the shaft 31.

The hub 33 is an annular member that holds the rotor magnet 34. As a material of the hub 33, for example, a metal such as iron is used. The hub 33 includes a disk portion 331 and a cylindrical portion 332. The disk portion 331 expands substantially perpendicular to the central axis 9 above the stator 24. An inner peripheral portion of the disk portion 331 is fixed to the fixing ring 32. That is, the hub 33 is fixed to the shaft 31 via the fixing ring 32. The cylindrical portion 332 extends downward from an outer peripheral portion of the disk portion 331.

The rotor magnet 34 is fixed to an inner peripheral surface of the cylindrical portion 332. The rotor magnet 34 may be an annular magnet or a plurality of magnets disposed in the circumferential direction. An end surface of the teeth 412 on the outside in the radial direction and a surface of the rotor magnet 34 on the inside in the radial direction face each other in the radial direction with a slight gap. In addition, an N pole and an S pole are alternately magnetized in the circumferential direction on a surface of the rotor magnet 34 on the inside in the radial direction.

In such a motor 1, when the drive current is supplied from the circuit board 25 to the coil 43 of the stator 24, a magnetic flux is generated in each tooth 412. A torque in the circumferential direction is generated by a rotating magnetic field generated between the teeth 412 and the rotor magnet 34. As a result, the rotating portion 3 rotates with respect to the stationary portion 2 centered on the central axis 9.

Figure 2:
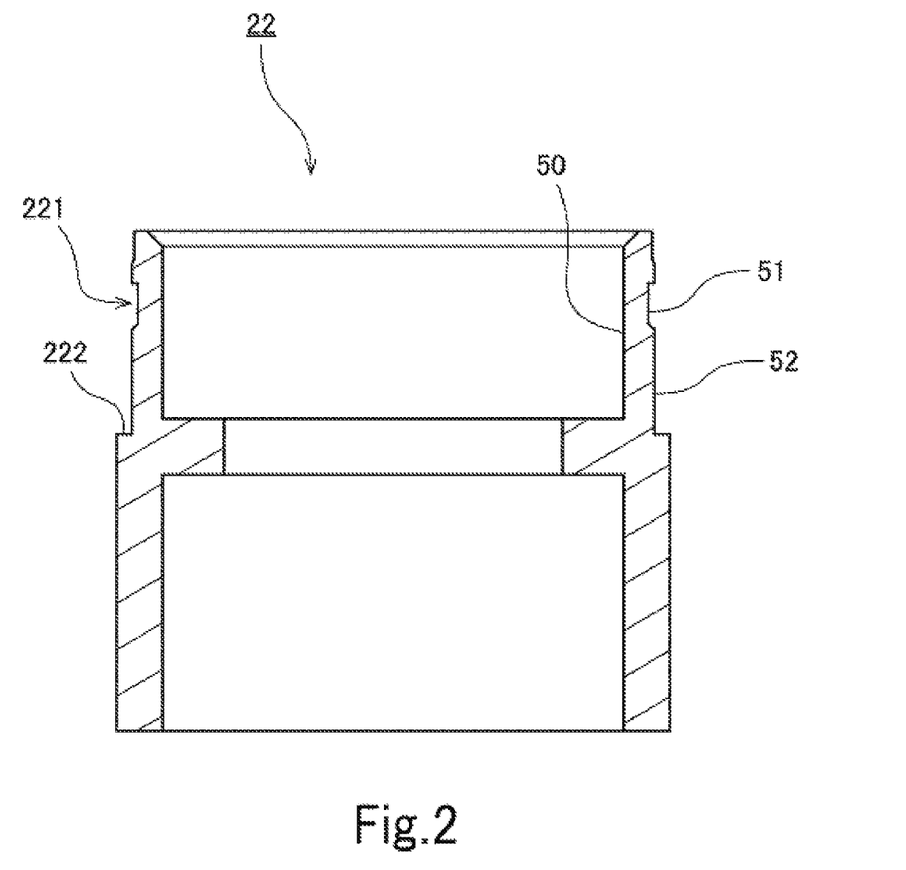
FIG. 2 is a longitudinal sectional view of a bearing housing.
Figure 3:
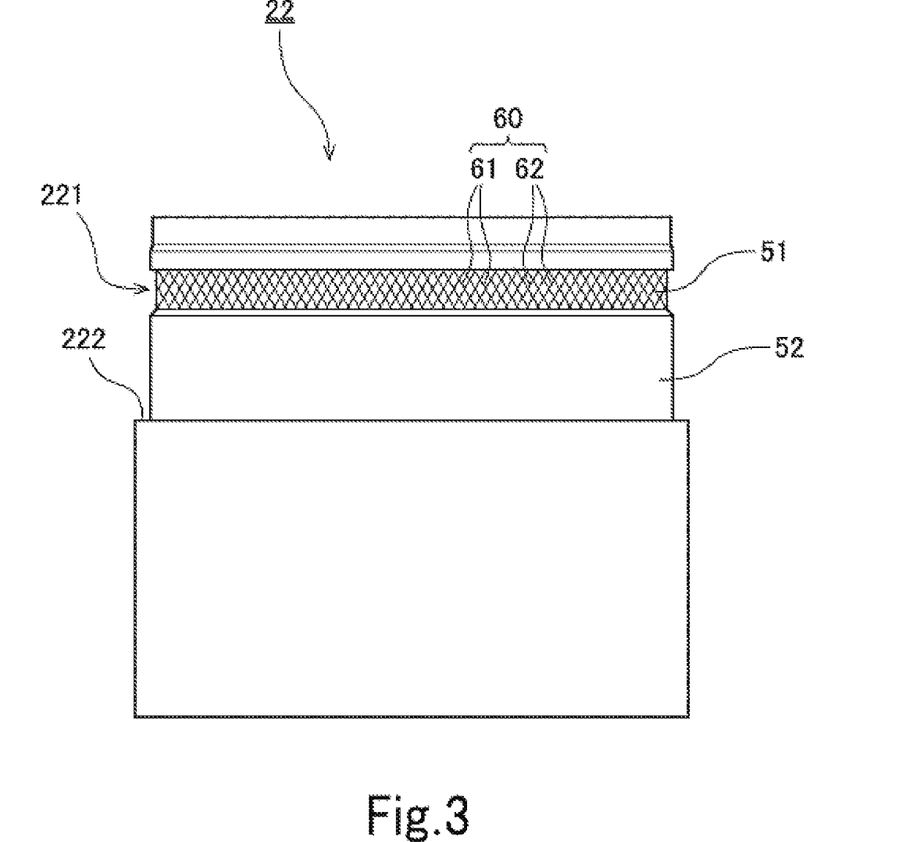
FIG. 3 is a side view of the bearing housing.
Figure 4:
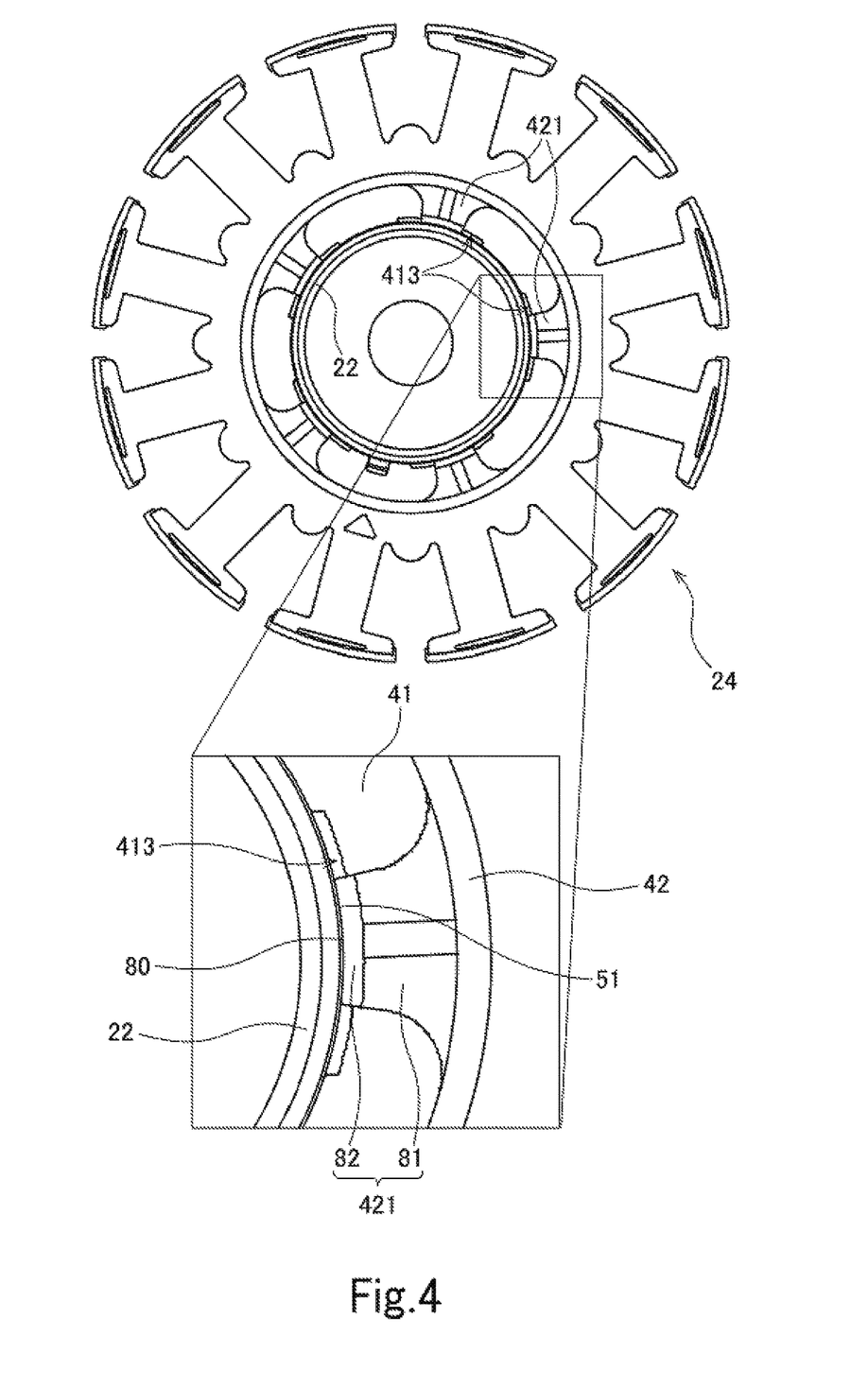
FIG. 4 is a top view of the bearing housing and a stator.
Figure 5:
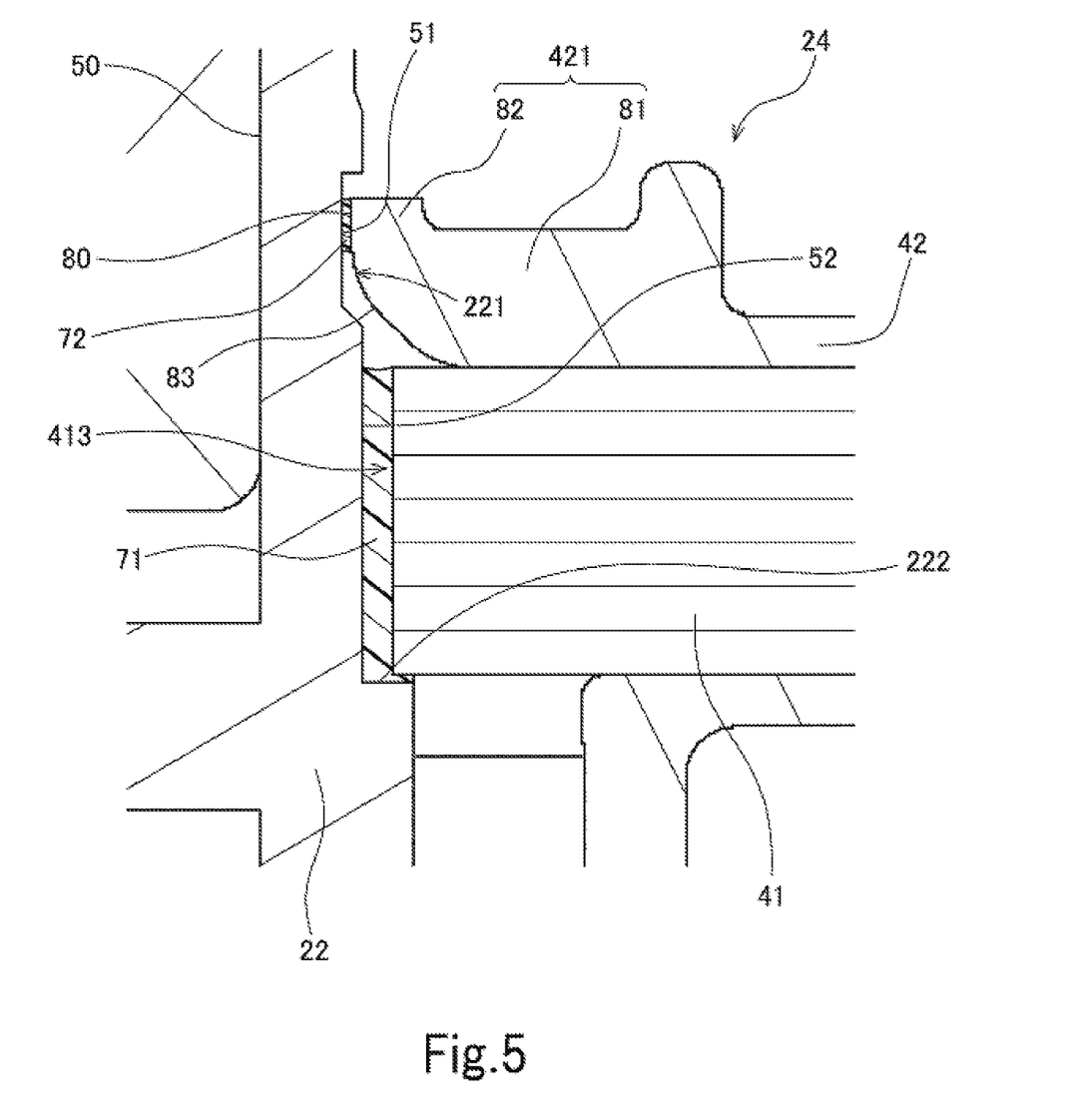
FIG. 5 is a partial sectional view of the bearing housing and the stator.
Figure 6:
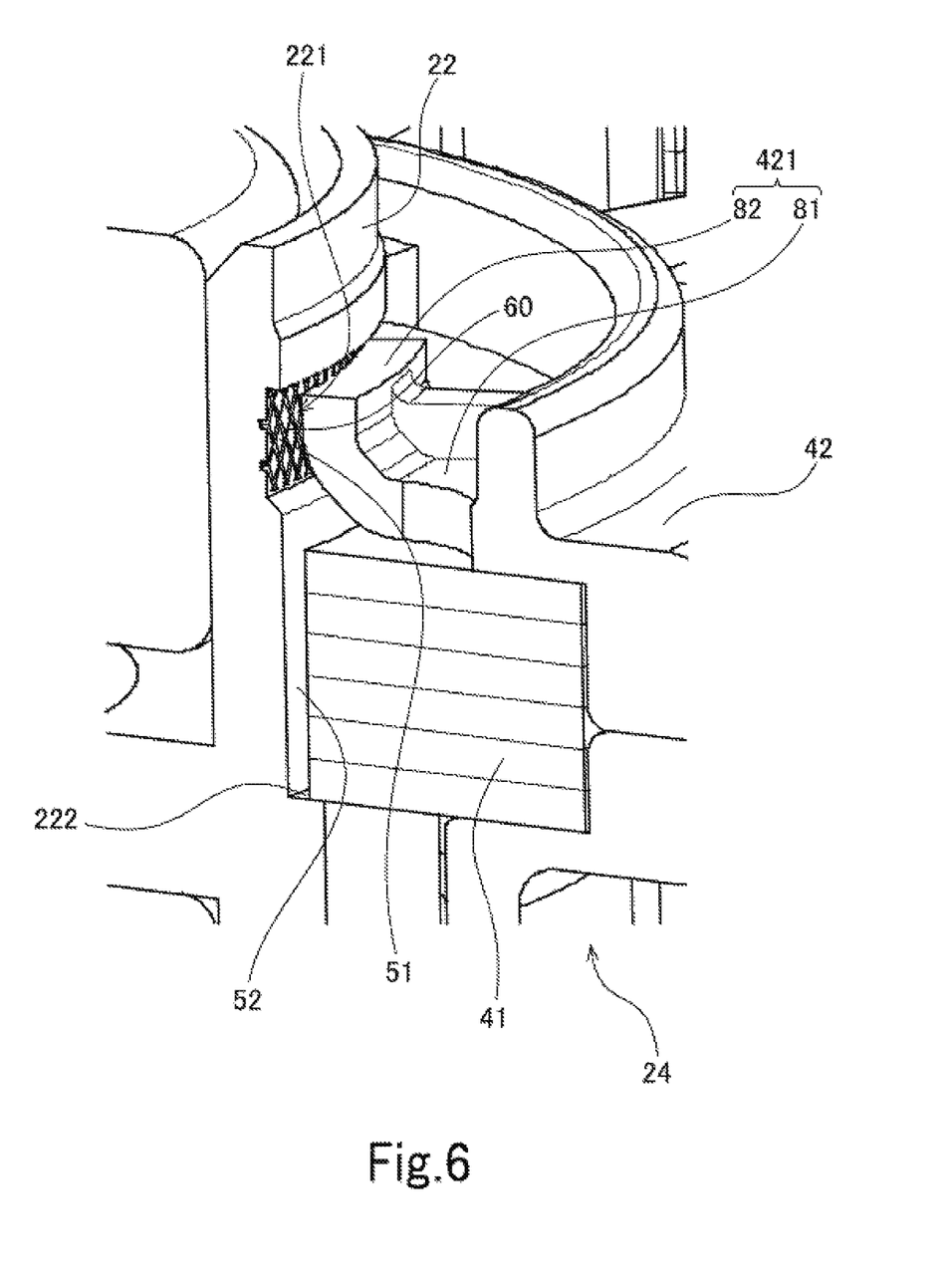
FIG. 6 is a partial perspective view of the bearing housing and the stator broken along a plane including a central axis.

Subsequently, a fixing structure between the bearing housing 22 and the stator 24 will be described in detail. FIG. 2 is a longitudinal sectional view of the bearing housing 22. FIG. 3 is a side view of the bearing housing 22. FIG. 4 is a top view of the bearing housing 22 and the stator 24. FIG. 5 is a partial sectional view of the bearing housing 22 and the stator 24. FIG. 6 is a partial perspective view of the bearing housing 22 and the stator 24 broken along a plane including the central axis 9.

As illustrated in FIGS. 2 and 3, the bearing housing 22 includes a first inner peripheral surface 50, a first outer peripheral surface 51, and a second outer peripheral surface 52. The first inner peripheral surface 50 is a surface for holding the bearing 23 on the inner peripheral surface of the bearing housing 22. Specifically, the outer ring of the bearing 23 is fixed to the first inner peripheral surface 50. In order to highly accurately position the bearing 23 with respect to the bearing housing 22, it is preferable that the first inner peripheral surface 50 is machined into a true circle with high accuracy and a surface roughness is small.

The first outer peripheral surface 51 is a surface that faces the insulator 42 in the radial direction on the outer peripheral surface of the bearing housing 22. The second outer peripheral surface 52 is a surface that faces the stator core 41 in the radial direction on the outer peripheral surface of the bearing housing 22. The second outer peripheral surface 52 is positioned lower than the first outer peripheral surface 51 in the axial direction.

As illustrated in FIG. 5, a silicone-base elastic adhesive 71 is interposed between the second outer peripheral surface 52 of the bearing housing 22 and the inner peripheral surface of the stator core 41. The bearing housing 22 and the stator core 41 are connected via the elastic adhesive 71. The elastic adhesive 71 is an example of a "main adhesive" in the invention. The elastic adhesive 71 is elastically deformable even after curing. Therefore, the elastic adhesive 71 has a function of fixing the stator core 41 to the bearing housing 22 and a function of absorbing vibration generated in the stator core 41. Transmission of the vibration from the stator core 41 to the bearing housing 22 is suppressed by using the elastic adhesive 71. As a result, the vibration and noise during driving the motor 1 are reduced.

However, the elastic adhesive 71 may have a long curing time after coating. Therefore, as illustrated in FIG. 5, the first outer peripheral surface 51 of the bearing housing 22 and the insulator 42 are connected to each other by an ultraviolet curable adhesive 72. The ultraviolet curable adhesive 72 is an example of an "auxiliary adhesive" in the invention. The ultraviolet curable adhesive 72 is cured in a very short time by being irradiated with ultraviolet rays after coating. After application of the elastic adhesive 71, the bearing housing 22 and the stator 24 are temporarily fixed by the ultraviolet curable adhesive 72 until the elastic adhesive 71 is cured. Therefore, it is possible to suppress that the position of the stator 24 with respect to the bearing housing 22 is deviated during curing the elastic adhesive 71.

That is, two types of adhesives of the elastic adhesive 71, which is the main adhesive, and the ultraviolet curable adhesive 72, which is the auxiliary adhesive of which a curing time is shorter than that of the main adhesive, are interposed between the bearing housing 22 and the stator 24.

As illustrated in FIGS. 4 to 6, the insulator 42 of the embodiment includes a plurality of claw portions 421. The plurality of the claw portions 421 are arranged at equal intervals in the circumferential direction. In addition, each claw portion 421 projects from an annular inner peripheral surface of the insulator 42 to the inside in the radial direction. An end surface 80 of each claw portion 421 on the inside in the radial direction is connected to the first outer peripheral surface 51 of the bearing housing 22 by the ultraviolet curable adhesive 72.

The ultraviolet curable adhesive 72 is in contact with the first outer peripheral surface 51 of the bearing housing 22 and the end surface 80 of the claw portion 421 on the inside in the radial direction. In addition, it is preferable that a part of the ultraviolet curable adhesive 72 is also in contact with an end surface of the claw portion 421 in the circumferential direction. Therefore, the position deviation of the claw portion 421 with respect to the bearing housing 22 in the circumferential direction can be further suppressed. In addition, it is preferable that another part of the ultraviolet curable adhesive 72 is also in contact with an end surface of the claw portion 421 in the axial direction. Therefore, the position deviation of the claw portion 421 with respect to the bearing housing 22 in the axial direction can be further suppressed.

In addition, as illustrated in FIG. 3, the first outer peripheral surface 51 of the bearing housing 22 is formed of a plurality of grooves 60. Therefore, a surface roughness of the first outer peripheral surface 51 is larger than a surface roughness of the first inner peripheral surface 50. That is, the first outer peripheral surface 51 is rougher than the first inner peripheral surface 50. The end surface 80 of the claw portion 421 on the inside in the radial direction is in contact with the first outer peripheral surface 51 including such grooves 60. A friction coefficient between the first outer peripheral surface 51 and the claw portion 421 is higher than that in a case without the grooves 60, by the plurality of the grooves 60. Therefore, the position deviation of the claw portion 421 with respect to the first outer peripheral surface 51 is suppressed. That is, the position deviation of the stator 24 with respect to the bearing housing 22 is suppressed.

In the embodiment, the plurality of the grooves 60 form a cross-hatching pattern. That is, the plurality of the grooves 60 include a plurality of first grooves 61 which are inclined to the axial direction and a plurality of second grooves 62 which extend at an angle different from that of the first grooves 61. The plurality of the first grooves 61 and the plurality of the second grooves 62 intersect one another. The grooves 60 are formed by, for example, knurling. Not only the position deviation of the stator 24 with respect to the bearing housing 22 in the circumferential direction but also the position deviation in the axial direction is suppressed by making the plurality of the grooves 60 the cross-hatching pattern.

In addition, a part of the ultraviolet curable adhesive 72 described above is held by the plurality of the grooves 60. Therefore, the ultraviolet curable adhesive 72 can be reliably interposed between the bearing housing 22 and the claw portion 421. As a result, a fixing strength of the insulator 42 with respect to the bearing housing 22 can be further enhanced.

For example, in a case where the insulator 42 is fixed to the bearing housing 22 by using an interference fit structure, an excessive stress is applied to the bearing housing 22 or the insulator 42, which may cause deformation, breakage, or the like. On the other hand, in the embodiment, the bearing housing 22 and the insulator 42 are connected to each other by the ultraviolet curable adhesive 72 that is the auxiliary adhesive. Therefore, deformation or breakage of the bearing housing 22 or the insulator 42 can be suppressed.

In the embodiment, in the first outer peripheral surface 51 and the second outer peripheral surface 52, the plurality of the grooves 60 are provided only on the first outer peripheral surface 51. Therefore, the surface roughness of the first outer peripheral surface 51 is larger than the surface roughness of the second outer peripheral surface 52. Therefore, in the first outer peripheral surface 51 and the second outer peripheral surface 52, the surface on which the plurality of the grooves 60 are formed is only the first outer peripheral surface 51, so that the manufacturing cost of the bearing housing 22 can be reduced. However, the second outer peripheral surface 52 may be provided with the grooves similar to those of the first outer peripheral surface 51.

As illustrated in FIGS. 5 and 6, the claw portion 421 of the embodiment includes a claw portion body 81 and a claw wall portion 82. The claw portion body 81 extends from the annular inner peripheral surface of the insulator 42 to the inside in the radial direction. The claw wall portion 82 extends upward in the axial direction from an end portion of the claw portion body 81 on the inside in the radial direction. The surface of the claw wall portion 82 on the inside in the radial direction becomes the end surface 80 of the claw portion 421 on the inside in the radial direction. That is, the ultraviolet curable adhesive 72 connects the bearing housing 22 and the claw wall portion 82. As described above, it is possible to widen an area of the end surface 80 by providing the claw wall portion 82. Therefore, it is possible to increase an application area of the ultraviolet curable adhesive 72 between the first outer peripheral surface 51 and the end surface 80. As a result, the position deviation of the stator 24 with respect to the bearing housing 22 can be further suppressed.

In addition, the claw wall portion 82 can be bent slightly. Therefore, the claw wall portion 82 can be in elastic contact with the first outer peripheral surface 51. That is, it is possible to press the end surface 80 of the claw portion 421 against the first outer peripheral surface 51. Therefore, the contact area of the first outer peripheral surface 51 and the end surface 80 via the ultraviolet curable adhesive 72 increases. In addition, the position deviation of the stator 24 with respect to the bearing housing 22 can be further suppressed.

In addition, as illustrated in FIG. 4, the end surface 80 of the claw portion 421 of the embodiment is a recessed curved surface in top view. A radius of curvature of the end surface 80 that is a curved surface is the same as that of the first outer peripheral surface 51. However, the term "same" as used herein includes both a case of completely identical and a case of substantially identical. As described above, if the radius of curvature of the end surface 80 and the radius of curvature of the first outer peripheral surface 51 are the same as each other, the contact area between the end surface 80 and the first outer peripheral surface 51 via the ultraviolet curable adhesive 72 is increased. As a result, the position deviation of the stator 24 with respect to the bearing housing 22 is further suppressed.

Moreover, the radius of curvature of the end surface 80 of the claw portion 421 may be smaller than that of the first outer peripheral surface 51. In this case, the ultraviolet curable adhesive 72 is held in a gap between the end surface 80 of the claw portion 421 and the first outer peripheral surface 51. In addition, an end portion of the end surface 80 of the claw portion 421 in the circumferential direction is caught by the first outer peripheral surface 51. Therefore, the position deviation of the stator 24 with respect to the bearing housing 22 in the circumferential direction is further suppressed. Particularly if the end portion of the end surface 80 in the circumferential direction is fitted into the grooves 60 of the first outer peripheral surface 51, the position deviation of the stator 24 with respect to the bearing housing 22 in the circumferential direction is further suppressed.

In addition, as illustrated in FIGS. 2, 3, 5, and 6, the bearing housing 22 of the embodiment has an annular housing recessed portion 221 on the outer peripheral surface. The housing recessed portion 221 is recessed from the outer peripheral surface of the bearing housing 22 to the inside in the radial direction. The first outer peripheral surface 51 is positioned in the housing recessed portion 221. Therefore, the end surface 80 of the claw portion 421 and the ultraviolet curable adhesive 72 are accommodated in the housing recessed portion 221. As described above, if the end surface 80 of the claw portion 421 is accommodated in the housing recessed portion 221, the position deviation of the claw portion 421 with respect to the bearing housing 22 in the axial direction can be suppressed. Therefore, the position deviation of the stator 24 with respect to the bearing housing 22 in the axial direction can be suppressed.

Furthermore, in the embodiment, a lower portion of the end surface 80 of the claw portion 421 has a smooth curved surface 83. When the stator 24 is inserted into the bearing housing 22, the curved surface 83 can slide and move on an outer surface of the bearing housing 22. Therefore, it is possible to suppress catching of the claw portion 421 by the bearing housing 22 and to prevent breakage of the claw portion 421. In addition, the end surface 80 of the claw portion 421 can be easily accommodated in the housing recessed portion 221 by providing the curved surface 83. Moreover, as illustrated in FIG. 5, it is preferable that an upper portion of the end surface 80 of the claw portion 421 has a rectangular shape. It is possible to prevent detachment of the claw portion 421 upward in the axial direction from the housing recessed portion 221 by making the upper portion angular.

In addition, as illustrated in FIG. 4, the stator core 41 of the embodiment has a plurality of core recessed portions 413 on the inner peripheral surface. The plurality of the core recessed portions 413 are arranged at equal intervals in the circumferential direction. Each core recessed portion 413 is recessed from the inner peripheral surface of the stator core 41 to the outside in the radial direction. The elastic adhesive 71 is positioned in the core recessed portion 413. As described above, if the core recessed portion 413 that holds the elastic adhesive 71 is provided on the inner peripheral surface of the stator core 41, a variation in an amount of the elastic adhesive 71 interposed between the bearing housing 22 and the stator core 41 can be suppressed. In addition, a portion other than the core recessed portion 413 in the inner peripheral surface of the stator core 41 is in direct contact with the second outer peripheral surface 52 of the bearing housing 22. Therefore, the stator core 41 can be positioned with respect to the bearing housing 22 with higher accuracy.

As illustrated in FIG. 4, in the embodiment, the number of the core recessed portions 413 included in the stator core 41 and the number of the claw portions 421 included in the insulator are the same. The claw portion 421 and the core recessed portion 413 are disposed at positions overlapping each other in top view. Therefore, in a manufacturing step of the motor 1, it is easy to hold the inner peripheral portion of the stator 24 while avoiding the claw portion 421 and the core recessed portion 413. For example, when the coil 43 of the stator 24 is formed, a jig of a winding machine can hold the inner peripheral portion of the stator 24 while avoiding the claw portion 421 and the core recessed portion 413.

In addition, as illustrated in FIGS. 2, 3, 5, and 6, the bearing housing 22 of the embodiment has an annular stepped surface 222 on the outer peripheral surface. The stepped surface 222 expands from the lower end portion of the second outer peripheral surface 52 to the outside in the radial direction. A part of the stepped surface 222 faces a part of the lower surface of the stator core 41 in the axial direction. The position deviation of the stator 24 with respect to the bearing housing 22 to the lower side in the axial direction is suppressed by the stepped surface 222.

As illustrated in FIG. 5, a part of the elastic adhesive 71 may be interposed between the lower surface of the stator core and the stepped surface 222. Therefore, transmission of vibration from the lower surface of the stator core 41 to the bearing housing 22 is also suppressed. Therefore, vibration and noise during driving the motor 1 can be further reduced.

Although an exemplary embodiment of the present disclosure is described above, the present disclosure is not limited to the above-described embodiments.

Figure 7:
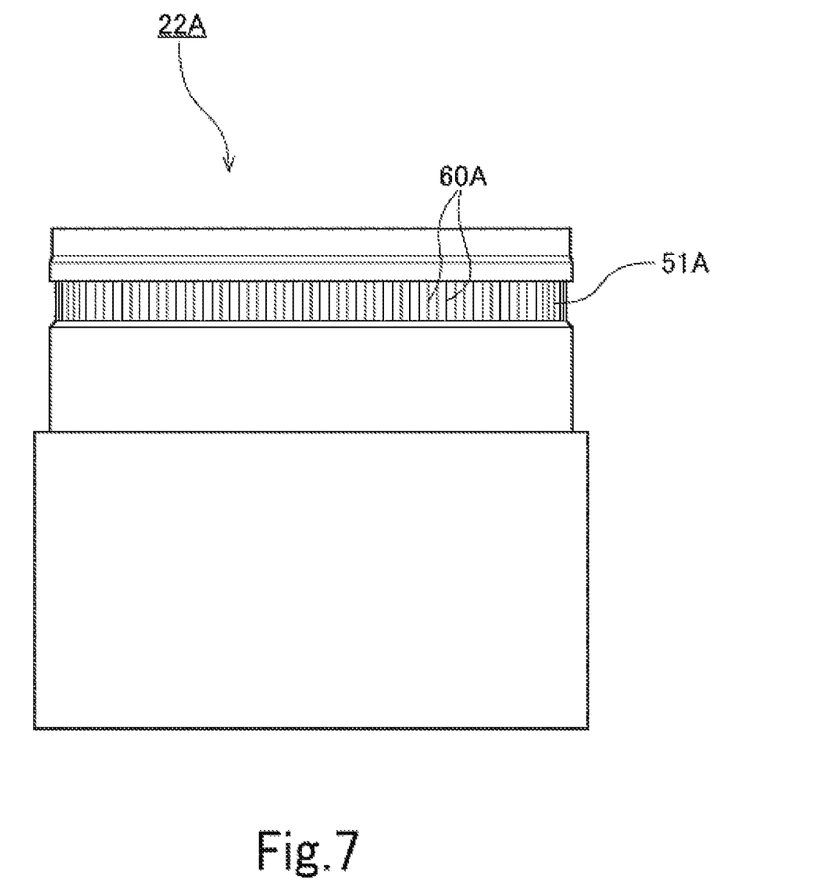
FIG. 7 is a side view of a bearing housing according to a modification example.

FIG. 7 is a side view of a bearing housing 22A according to an exemplary modification example of the disclosure. In the example of FIG. 7, a first outer peripheral surface 51A of the bearing housing 22A is formed with a plurality of grooves 60A having a vertical stripe pattern. That is, the plurality of the grooves 60A extend in the axial direction and are arranged in the circumferential direction. As described above, if the plurality of the grooves 60A are formed in the vertical stripe pattern, a direction of each groove is perpendicular to the circumferential direction. Therefore, the effect of suppressing the position deviation of the stator with respect to the bearing housing 22A in the circumferential direction is further enhanced.

Figure 8:
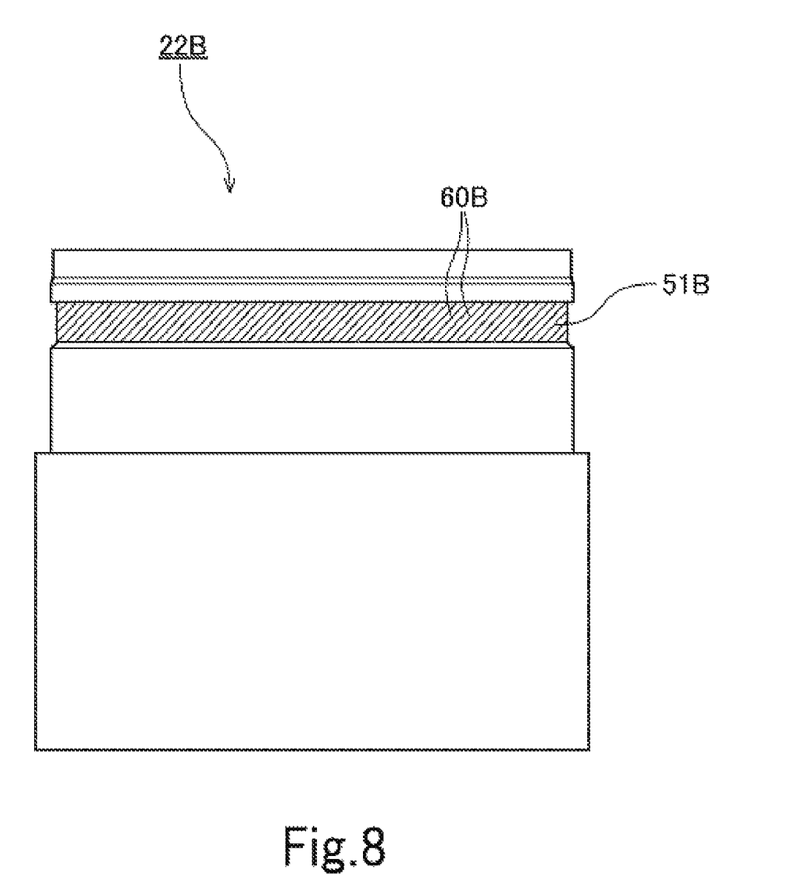
FIG. 8 is a side view of a bearing housing of a modification example.

FIG. 8 is a side view of a bearing housing 22B according to another exemplary modification example of the disclosure. In the example of FIG. 8, a first outer peripheral surface 51B of the bearing housing 22B is formed with a plurality of grooves 60B having a spiral pattern. That is, the plurality of the grooves 60B extend centered on the central axis in a spiral shape. Also in such a pattern, the position deviation of the stator with respect to the bearing housing 22B can be suppressed.

In addition, in the embodiment and the modification examples, in order to increase the surface roughness of the first outer peripheral surface, the plurality of the grooves are formed on the first outer peripheral surface. However, the surface roughness of the first outer peripheral surface may be increased by another method. For example, a plurality of projections may be formed on the first outer peripheral surface. In addition, discontinuous surface roughness may be formed by using a grindstone or the like.

Figure 9:
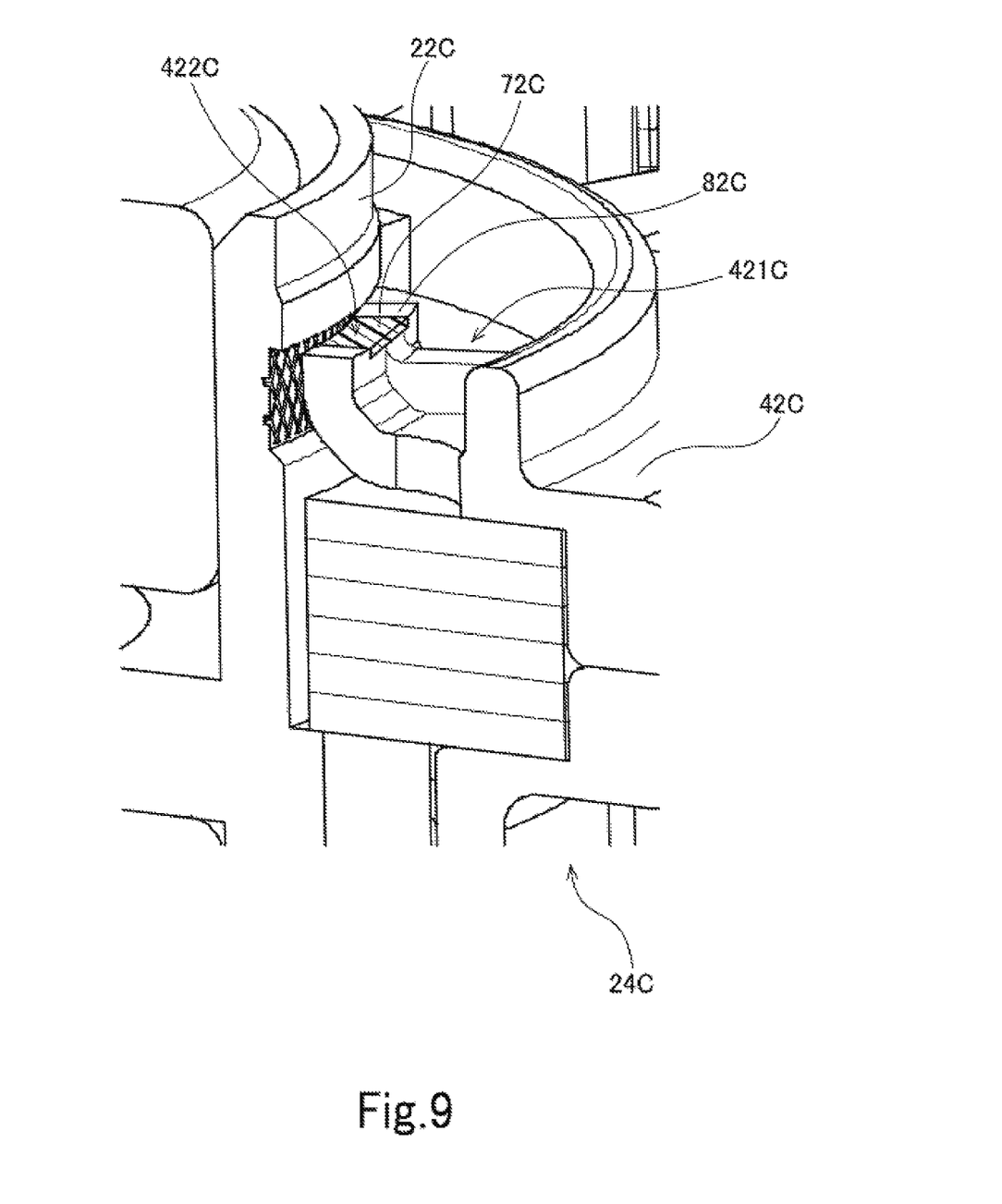
FIG. 9 is a partial perspective view of a bearing housing and a stator of a modification example.

FIG. 9 is a partial perspective view of a bearing housing 22C and a stator 24C of another exemplary modification example of the disclosure. In the example of FIG. 9, a claw portion 421C of an insulator 42C is provided with a claw recessed portion 422C. The claw recessed portion 422C is a recess provided in a claw wall portion 82C. At least a part of the claw recessed portion 422C is positioned at an end surface of the claw portion 421C on the inside in the radial direction. Therefore, an inside of the claw recessed portion 422C can be filled with an ultraviolet curable adhesive 72C of a stable amount. The bearing housing 22C and the claw portion 421C can be connected to each other by the ultraviolet curable adhesive 72C which is held in the claw recessed portion 422C. In addition, flowing-down of the ultraviolet curable adhesive 72C to the stator core can be suppressed.

As described above, the ultraviolet curable adhesive may connect at least a part of the claw portion and at least a part of the bearing housing.

Figure 10:
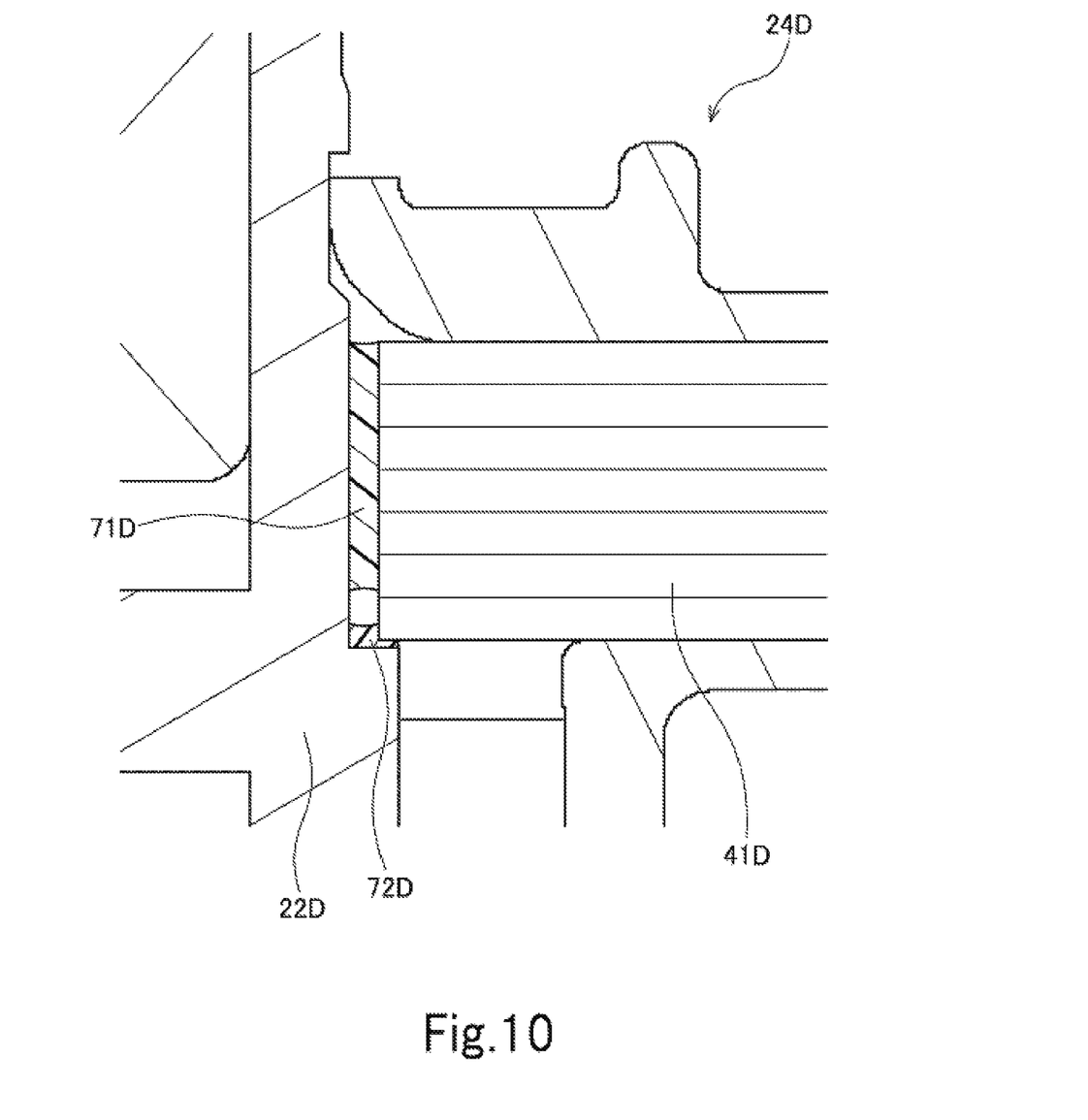
FIG. 10 is a partial sectional view of a bearing housing and a stator of a modification example.

FIG. 10 is a partial sectional view of a bearing housing 22D and a stator 24D of another exemplary modification example of the disclosure. In the example of FIG. 10, both an elastic adhesive 71D and an ultraviolet curable adhesive 72D are interposed between the bearing housing 22D and a stator core 41D. That is, the bearing housing 22D and the stator core 41D are connected to each other by both of the elastic adhesive 71D and the ultraviolet curable adhesive 72D. Therefore, the position of the stator core 41D with respect to the bearing housing 22D can be fixed with higher accuracy by the ultraviolet curable adhesive 72D until the elastic adhesive 71D is cured.

However, as in the embodiment described above, if the ultraviolet curable adhesive is applied to the insulator, there is no need to secure a space for applying the ultraviolet curable adhesive on the inner peripheral surface of the stator core. Therefore, a larger amount of the elastic adhesive can be interposed between the bearing housing and the stator core.

In addition, in the embodiment described above, the elastic adhesive is used as the main adhesive and the ultraviolet curable adhesive is used as the auxiliary adhesive. However, the main adhesive may be an adhesive other than the elastic adhesive. In addition, the auxiliary adhesive may be an adhesive other than the ultraviolet curable adhesive. A curing time of the auxiliary adhesive may be shorter than that of the main adhesive. For example, a thermosetting adhesive may be used as the main adhesive and the ultraviolet curable adhesive may be used as the auxiliary adhesive.

In addition, in the embodiment described above, the claw portion projecting from the annular inner peripheral surface of the insulator is connected to the first outer peripheral surface by the auxiliary adhesive. However, the connecting portion of the insulator to the first outer peripheral surface may be an annular inner peripheral surface of the insulator. Furthermore, in the embodiment described above, the upper portion of the insulator is connected to the first outer peripheral surface by the auxiliary adhesive. However, the lower portion of the insulator may be connected to the first outer peripheral surface via the auxiliary adhesive by providing the first outer peripheral surface below the stator core.

The application of an exemplary motor of the present disclosure is not particularly limited. An exemplary motor of the present disclosure may be, for example, a fan motor with an impeller attached to the rotating portion.

Further, the detailed shape of each member may be different from the shape illustrated in each drawing of the present disclosure. In addition, each element appearing in the embodiment and the modification examples described above may be appropriately combined within a range in which inconsistency does not occur.

The present invention can be applied to, for example, a motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a stationary portion; and
a rotating portion that is rotatably supported by the stationary portion centered on a central axis extending upward and downward,
wherein the stationary portion includes
a cylindrical bearing housing that extends in an axial direction around the central axis, and
a stator that is disposed on an outside of the bearing housing in a radial direction,
wherein the stator includes
a stator core that is a magnetic body,
an insulator that is an insulating body covering at least a part of the stator core, and
a conductor that is wound around the stator core via the insulator, and
wherein the bearing housing and the stator are connected to each other by
a main adhesive, and
an auxiliary adhesive of which a curing time is shorter than a curing time of the main adhesive.

2. The motor according to claim 1,
wherein the main adhesive is an elastic adhesive elastically deformable after curing.

3. The motor according to claim 2,
wherein the main adhesive connects the bearing housing and the stator core to each other.

4. The motor according to claim 1,
wherein the auxiliary adhesive is an ultraviolet curable adhesive.

5. The motor according to claim 4,
wherein the auxiliary adhesive connects the bearing housing and the stator core to each other.

6. The motor according to claim 4,
wherein the auxiliary adhesive connects the bearing housing and the insulator to each other.

7. The motor according to claim 6,
wherein the bearing housing includes
a first outer peripheral surface that faces the insulator in the radial direction,
wherein the first outer peripheral surface has a plurality of grooves, and
wherein the auxiliary adhesive connects the first outer peripheral surface and the insulator to each other.

8. The motor according to claim 7,
wherein the plurality of grooves include
a plurality of first grooves that extend obliquely with respect to the axial direction, and
a plurality of second grooves that extend at an angle different from an angle of the first grooves, and
wherein the plurality of first grooves and the plurality of second grooves intersect one another.

9. The motor according to claim 7,
wherein the plurality of grooves extend in the axial direction and are disposed in a circumferential direction.

10. The motor according to claim 7,
wherein the plurality of grooves extend spirally centered on the central axis.

11. The motor according to claim 1,
wherein the insulator includes
a claw portion that projects to an inside in the radial direction, and wherein the auxiliary adhesive connects at least a part of the claw portion and the bearing housing to each other.

12. The motor according to claim 11, wherein the insulator includes a plurality of claw portions, each of which is the claw portion.

13. The motor according to claim 12, wherein the plurality of claw portions are disposed at equal intervals in a circumferential direction.

14. The motor according to claim 11, wherein the auxiliary adhesive is in contact with both
an end surface of the claw portion on the inside in the radial direction, and
an end surface of the claw portion in a circumferential direction.

15. The motor according to claim 11, wherein the claw portion includes
a claw portion body that extends to the inside in the radial direction, and
a claw wall portion that extends from an end portion of the claw portion body on the inside in the radial direction to an upper side of the claw portion body in the axial direction, and
wherein the auxiliary adhesive connects the bearing housing and the claw wall portion to each other.

16. The motor according to claim 11, wherein the bearing housing includes a housing recessed portion that is recessed to the inside in the radial direction, on an outer peripheral surface,
wherein the outer peripheral surface is positioned at the housing recessed portion, and
wherein an end surface of the claw portion on the inside in the radial direction is accommodated in the housing recessed portion.

17. The motor according to claim 11, wherein the claw portion includes a claw recessed portion that is positioned on an end surface on the inside in the radial direction, and
wherein the auxiliary adhesive is positioned in the claw recessed portion and connects the claw portion and the bearing housing to each other.

18. The motor according to claim 11, wherein the stator core includes a plurality of core recessed portions that are recessed to an outside in the radial direction, on an inner peripheral surface, and
wherein the main adhesive is positioned in the core recessed portions.

19. The motor according to claim 18, wherein the claw portion and corresponding one of the core recessed portions overlap each other in top view.

20. The motor according to claim 1, wherein the bearing housing includes a stepped surface that faces a lower surface of the stator core in the axial direction, and
wherein a part of the main adhesive is interposed between the lower surface of the stator core and the stepped surface.

* * * * *